US010251044B2

(12) United States Patent  
Schmitz et al.

(10) Patent No.: US 10,251,044 B2  
(45) Date of Patent: Apr. 2, 2019

(54) SYSTEM AND METHOD FOR TWO-WAY MESSAGE TRANSMISSION ON MOBILE PLATFORMS FOR EMERGENCY AND NON-EMERGENCY COMMUNICATIONS

(71) Applicant: SWN Communications, Inc., New York, NY (US)

(72) Inventors: Anthony Schmitz, Clifton, NJ (US); Alexandros Tsepetis, Wenham, MA (US)

(73) Assignee: SWN COMMUNICATIONS INC.

( * ) Notice: Subject to any disclaimer, the term of this patent is extended or adjusted under 35 U.S.C. 154(b) by 0 days.

(21) Appl. No.: 14/507,967

(22) Filed: Oct. 7, 2014

(65) Prior Publication Data  
US 2015/0099482 A1 Apr. 9, 2015

Related U.S. Application Data

(60) Provisional application No. 61/888,565, filed on Oct. 9, 2013, provisional application No. 61/888,569, filed on Oct. 9, 2013.

(51) Int. Cl.  
*H04W 4/90* (2018.01)  
*H04W 4/12* (2009.01)  
(Continued)

(52) U.S. Cl.  
CPC .......... *H04W 4/90* (2018.02); *G06F 17/3023* (2013.01); *H04L 51/043* (2013.01); *H04W 4/12* (2013.01); *H04L 12/1895* (2013.01)

(58) Field of Classification Search  
CPC ..... G06F 17/3023; H04L 51/24; H04L 63/04; H04L 51/043; H04W 4/12; H04W 4/22; H04W 76/007; H04W 112/1895; H04W 4/90; G06Q 10/107  
USPC .................. 455/404.2, 404.1, 415, 564, 565; 340/426.19, 426.2, 426.23, 539.13, 340/539.16–21, 7.28; 709/206, 207  
See application file for complete search history.

(56) References Cited

U.S. PATENT DOCUMENTS 6,711,608 B1 3/2004 Ogilvie  
7,224,373 B1 5/2007 Duarte  
(Continued)

*Primary Examiner* — Kamran Afshar  
*Assistant Examiner* — Farid Seyedvosoghi  
(74) *Attorney, Agent, or Firm* — Jennifer Meredith, Esq.; Meredith & Keyhani, PLLC

(57) ABSTRACT

A method of transmitting emergency and non-emergency communications between a system backend facility (system) and at least one mobile platform (platform), the method comprising establishing a communication link between the system and the platform, providing a single-action voice calling module of the platform for communicating with the system, providing a message reception module of the platform for receiving a message sent from the system, providing a single-action location information transmission module of the platform for sending location information of the platform to the system, providing a single-action location information extraction module of the system for locating at least one recipient associated with the platform based on a predetermined attribute of the platform, and providing a single-action information dispatch module of the system for sending information to the located at least one recipient associated with the platform via the first protocol.

17 Claims, 13 Drawing Sheets

(51) Int. Cl.
*G06F 17/30* (2006.01)
*H04L 12/58* (2006.01)
*H04L 12/18* (2006.01)

(56) References Cited

U.S. PATENT DOCUMENTS

| | | |
|---|---|---|
| 7,729,684 B1 * | 6/2010 | Straub ........................ 455/404.2 |
| 8,176,562 B1 | 5/2012 | Hernacki |
| 8,320,875 B2 * | 11/2012 | Musgrove ............... H04W 4/22 |
| | | 323/299 |
| 2002/0107930 A1 | 8/2002 | Itoh |
| 2003/0105716 A1 | 6/2003 | Sutton |
| 2004/0267707 A1 | 12/2004 | Hayes-Roth |
| 2005/0044159 A1 * | 2/2005 | Niemi ................... H04L 12/581 |
| | | 709/207 |
| 2005/0091289 A1 | 4/2005 | Shappell |
| 2005/0169248 A1 * | 8/2005 | Truesdale .............. H04M 11/04 |
| | | 370/352 |
| 2005/0181775 A1 | 8/2005 | Rideout |
| 2008/0140732 A1 | 6/2008 | Wilson |
| 2009/0182833 A1 | 7/2009 | Balasubramanian |
| 2010/0003949 A1 * | 1/2010 | Ray ....................... G10L 13/043 |
| | | 455/404.1 |
| 2012/0054156 A1 | 3/2012 | Mason |
| 2012/0089569 A1 | 4/2012 | Mason |
| 2012/0322402 A1 * | 12/2012 | Sennett ................. H04W 4/001 |
| | | 455/404.1 |
| 2013/0173530 A1 | 7/2013 | Laron |
| 2014/0351346 A1 | 11/2014 | Barton |
| 2015/0081630 A1 | 3/2015 | Linsalata |
| 2015/0120842 A1 | 4/2015 | Huggins |

* cited by examiner

Login screen:

Left menu screen:

Alert centre listing with a EM, lockbox item, outgoing call, incoming call screen:

EM details screen:

Lockbox details:

Incoming call Accept/Reject screen:

Dial pad screen:

Outgoing call screen1:

Outgoing call screen2:

SYSTEM AND METHOD FOR TWO-WAY MESSAGE TRANSMISSION ON MOBILE PLATFORMS FOR EMERGENCY AND NON-EMERGENCY COMMUNICATIONS

1. FIELD OF DISCLOSURE

The present disclosure relates to the field of communications systems in general and, two-way message transmission on mobile platforms for emergency and non-emergency communications in particular. An end user is provided with an ability to download an application onto a mobile communication device wherein the application allows the end user to receive, interact with, and initiate various types of two-way messaging.

2. BRIEF DESCRIPTION OF RELATED ART

Traditionally, an end user can send and receive messages on a mobile communication device through a limited number of pathways including, for example, SMS ("short message service" for point to point communications). There are inherent limitations of the current SMS systems. As a delivery modality, SMS presents numerous challenges. For example, SMS message transmission may typically carry limited payloads of anywhere from 140 to 1200 characters. Further, SMS is a flat and only text-based modality which is unable to deliver rich text format files in a cost effective manner. Also, certain international markets may prohibit SMS delivery via active censorship. Likewise, SMS does not provide assurance of guaranteed delivery by the underlying carriers or delivery notification. Furthermore, SMS delivery may be a relatively expensive choice of message transmission in both domestic and international markets. Similarly, SMS diagnostics are relatively expensive and time consuming. Accordingly, there is a need for a reliable and cost effective system and method of data transmission which can transmit large payloads, which can support both text-based and non-text based data transmission in both domestic and international markets in spite of active censorship and which can support time and cost effective diagnostic systems. Also, conventional SMS does not provide a secured message transmission for dispatching sensitive information, in contrast, messages sent via SMS are typically sent unencrypted over the wire. Finally, a need for group members to share information via call conferencing exists in the modern business world. Existing SMS systems are unable to provide conference calling capability to the modern business world.

3. SUMMARY OF THE INVENTION

The present invention provides a method of transmitting emergency and non-emergency communications between a system backend facility and at least one mobile platform, the method comprising establishing a communication link between the system and the platform, providing a single-action voice calling module of the platform for communicating with the system, providing a message reception module of the platform for receiving a message sent from the system, providing a single-action location information transmission module of the platform for sending location information of the platform to the system, providing a single-action location information extraction module of the system for locating at least one recipient associated with the platform based on a predetermined attribute of the platform and providing a single-action information dispatch module of the system for sending information to the located at least one recipient associated with the platform via the first protocol.

According to one embodiment, a method of transmitting emergency and non-emergency communications between a system backend facility and at least one mobile platform is provided, the method comprising: establishing a communication link between the system backend facility and the at least one mobile platform via a first protocol providing a single-action voice calling module of at least one mobile platform for communicating with the system backend facility via a first client; providing a message reception module of the at least one mobile platform for receiving a message sent from the system backend facility; providing a single-action location information transmission module of the at least one mobile platform for sending location information of the at least one mobile platform to the system backend facility; providing a single-action location information extraction module of the system backend facility for locating at least one recipient associated with the at least one mobile platform based on a predetermined attribute of the at least one mobile platform to provide a located at least one recipient associated with the at least one mobile platform; and providing a single-action information dispatch module of the system backend facility for sending information to the located at least one recipient associated with the at least one mobile platform via the first protocol.

According to another embodiment, an information transmission system for facilitating communications between a system backend facility and at least one mobile platform is provided, the system comprising: a first protocol to establish a communication link between the system backend facility and at least one mobile platform; a single-action voice calling module of the at least one mobile platform to communicate with the system backend facility via a first client; a message reception module of the at least one mobile platform to receive a message sent from the system backend facility; a single-action location information transmission module of the at least one mobile platform to send location information of at least one mobile platform to the system backend facility; a single-action location information extraction module of the system backend facility to locate at least one recipient associated with the at least one mobile platform based on the a predetermined attribute of the at least one mobile platform; and a single-action information dispatch module of the system backend facility to send information to the located at least one recipient associated with the at least one mobile platform via the first protocol.

4. BRIEF DESCRIPTION OF THE DRAWINGS

Figure 3:
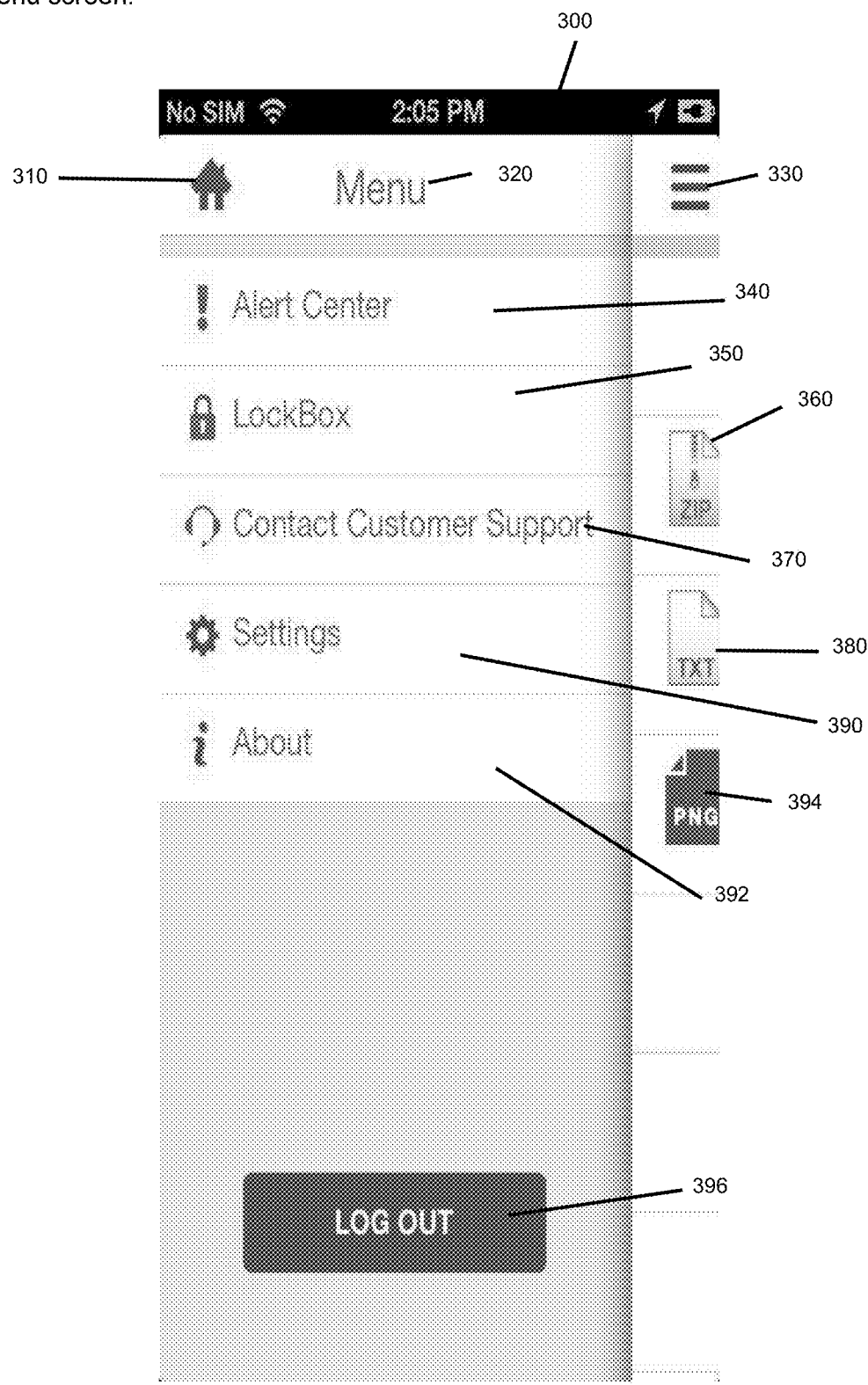
Figure 4:
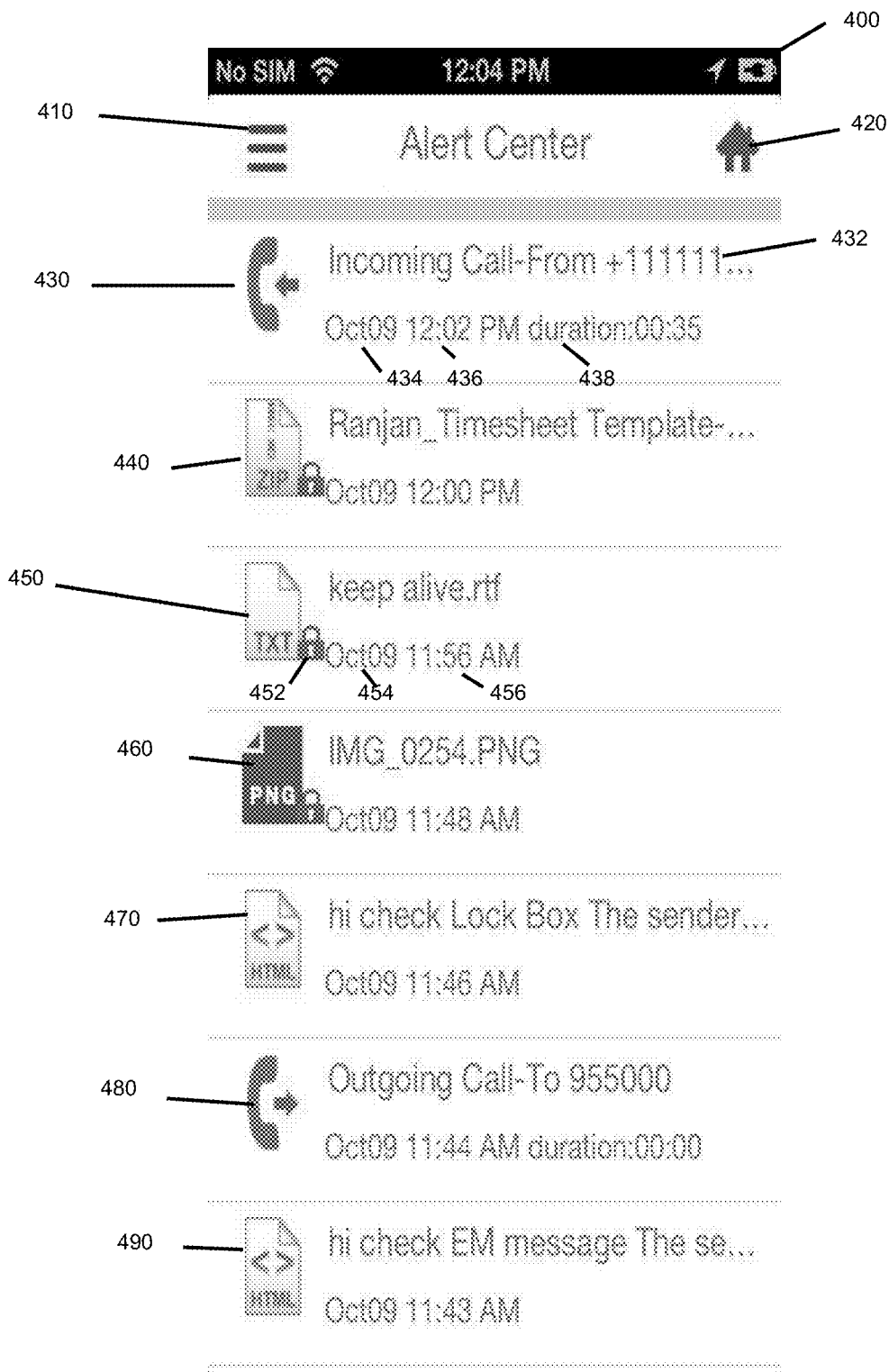
Figure 5:
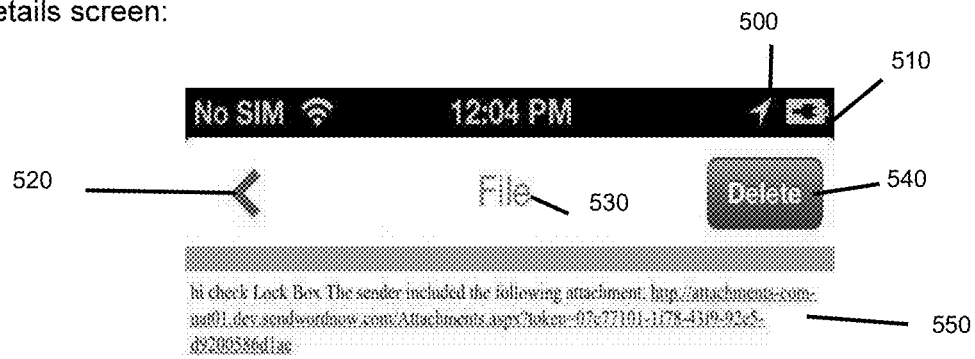
Figure 6:
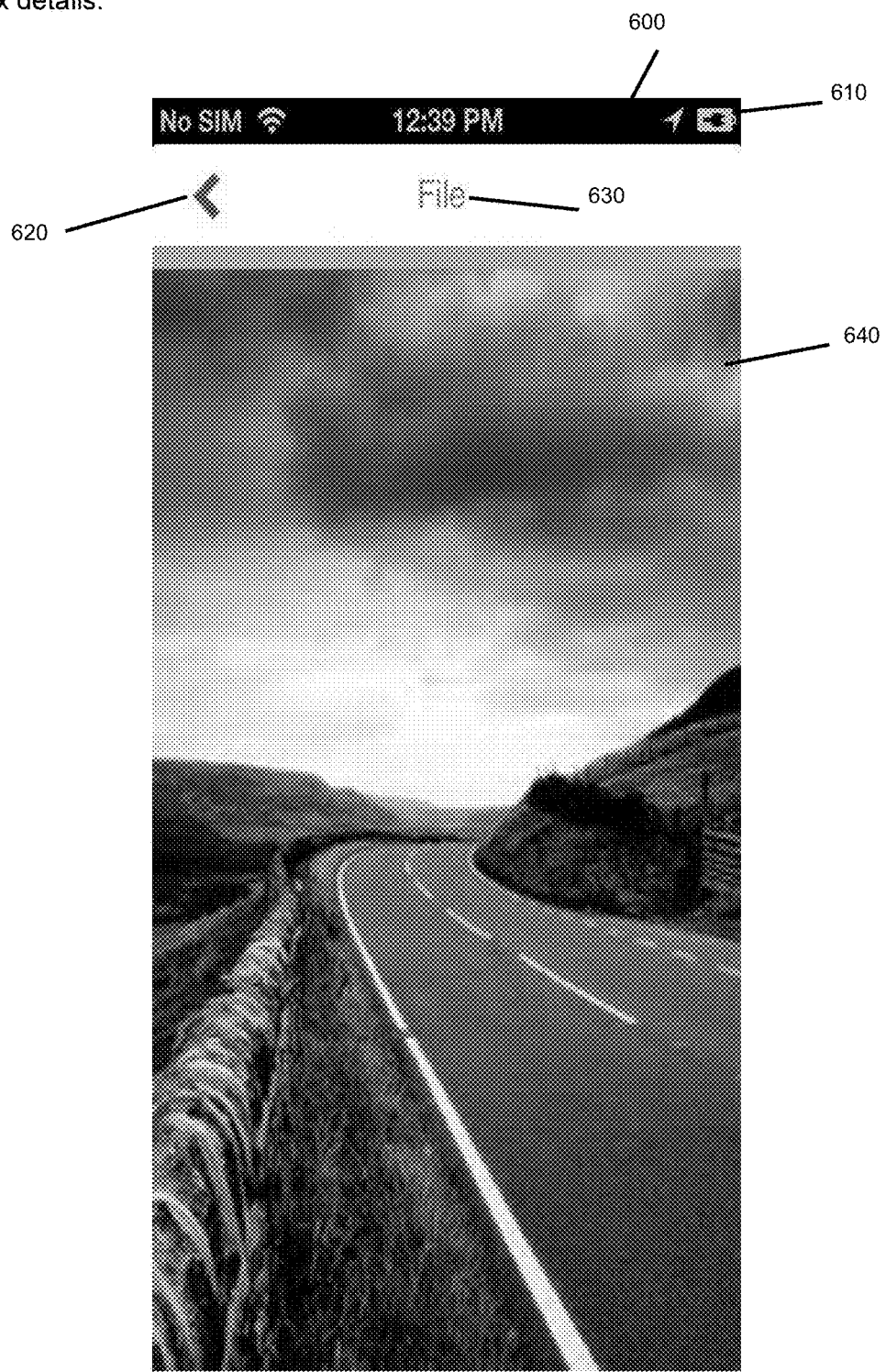
Figure 7:
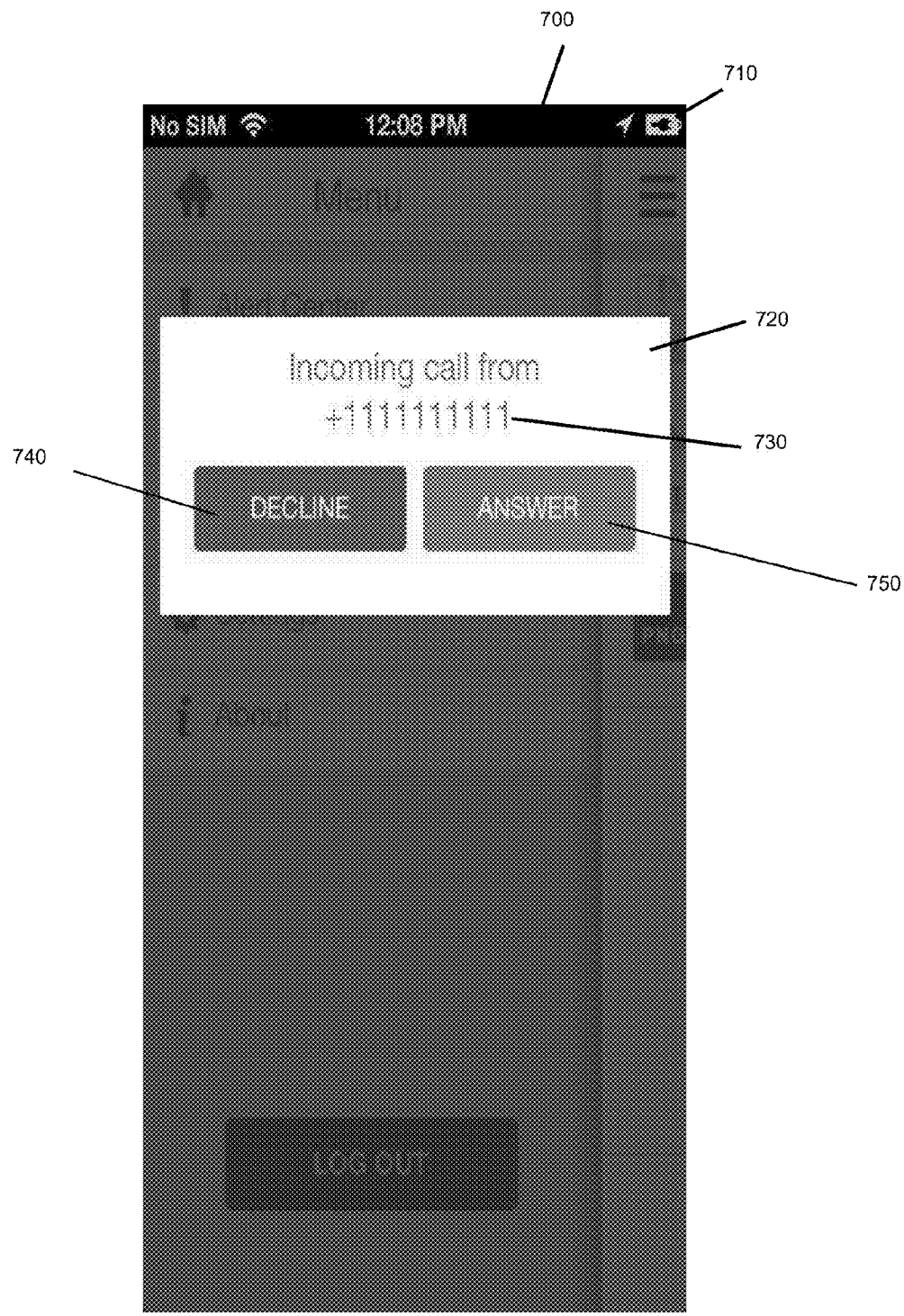
Figure 8:
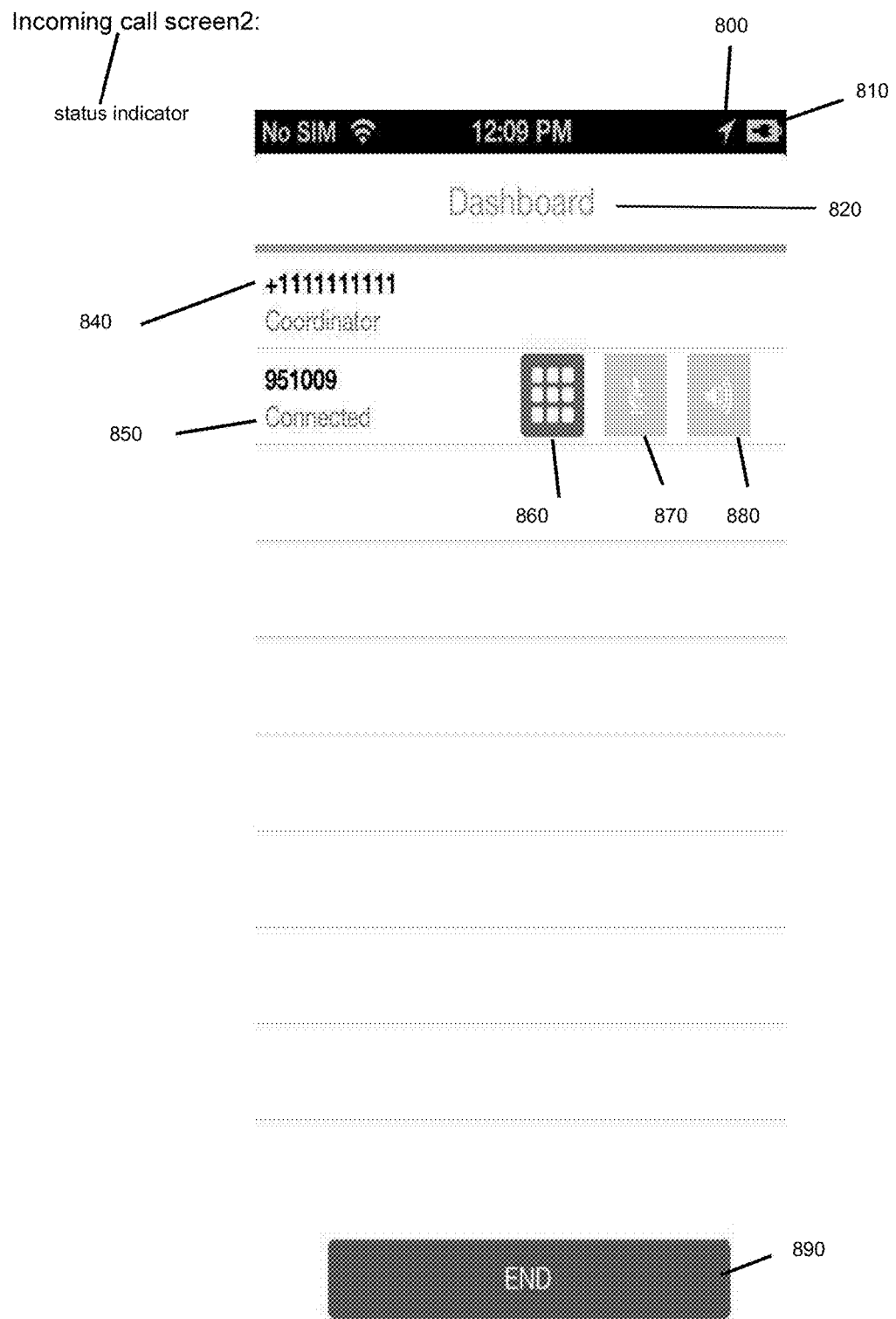
Figure 9:
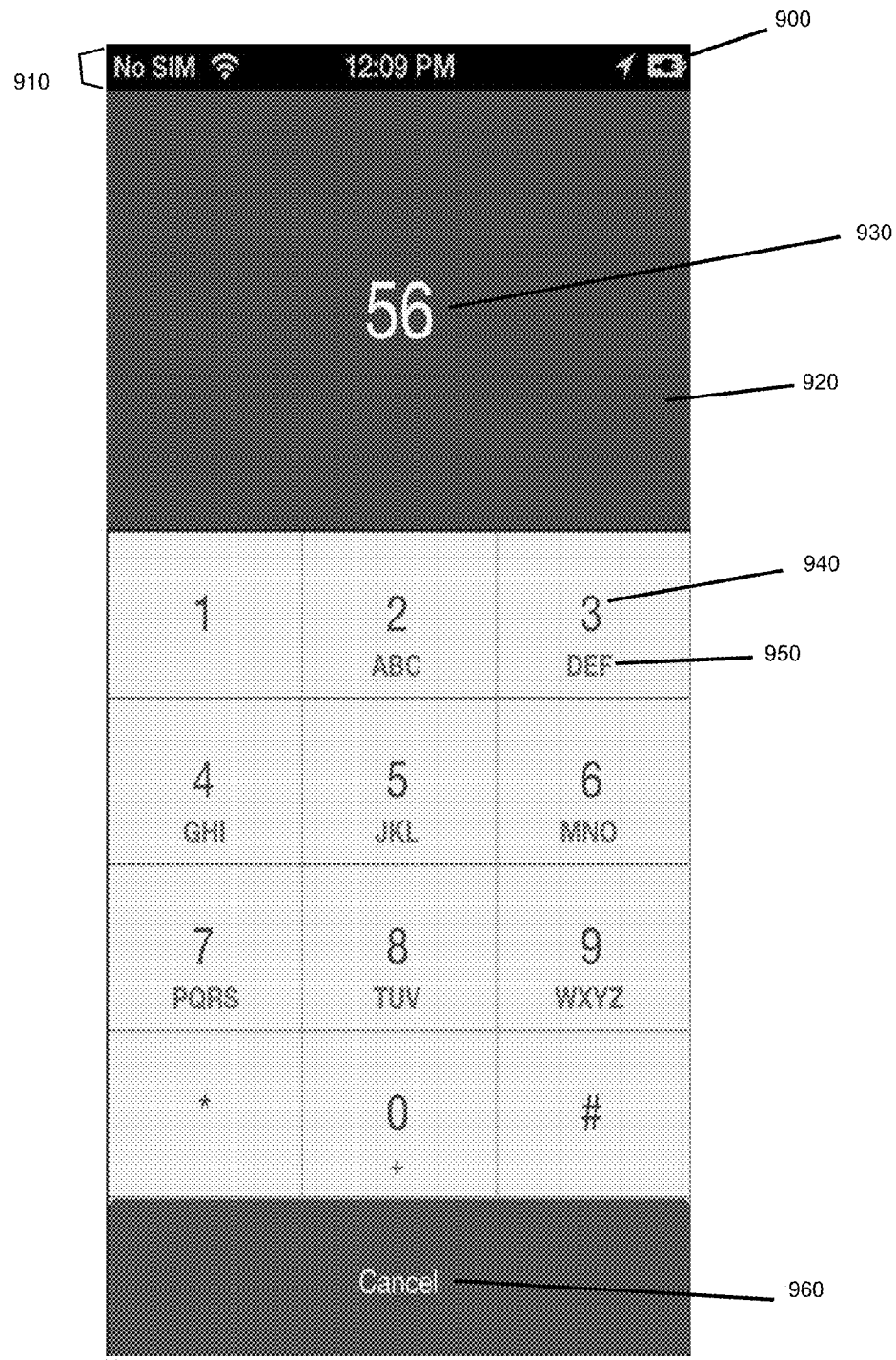
Figure 10:
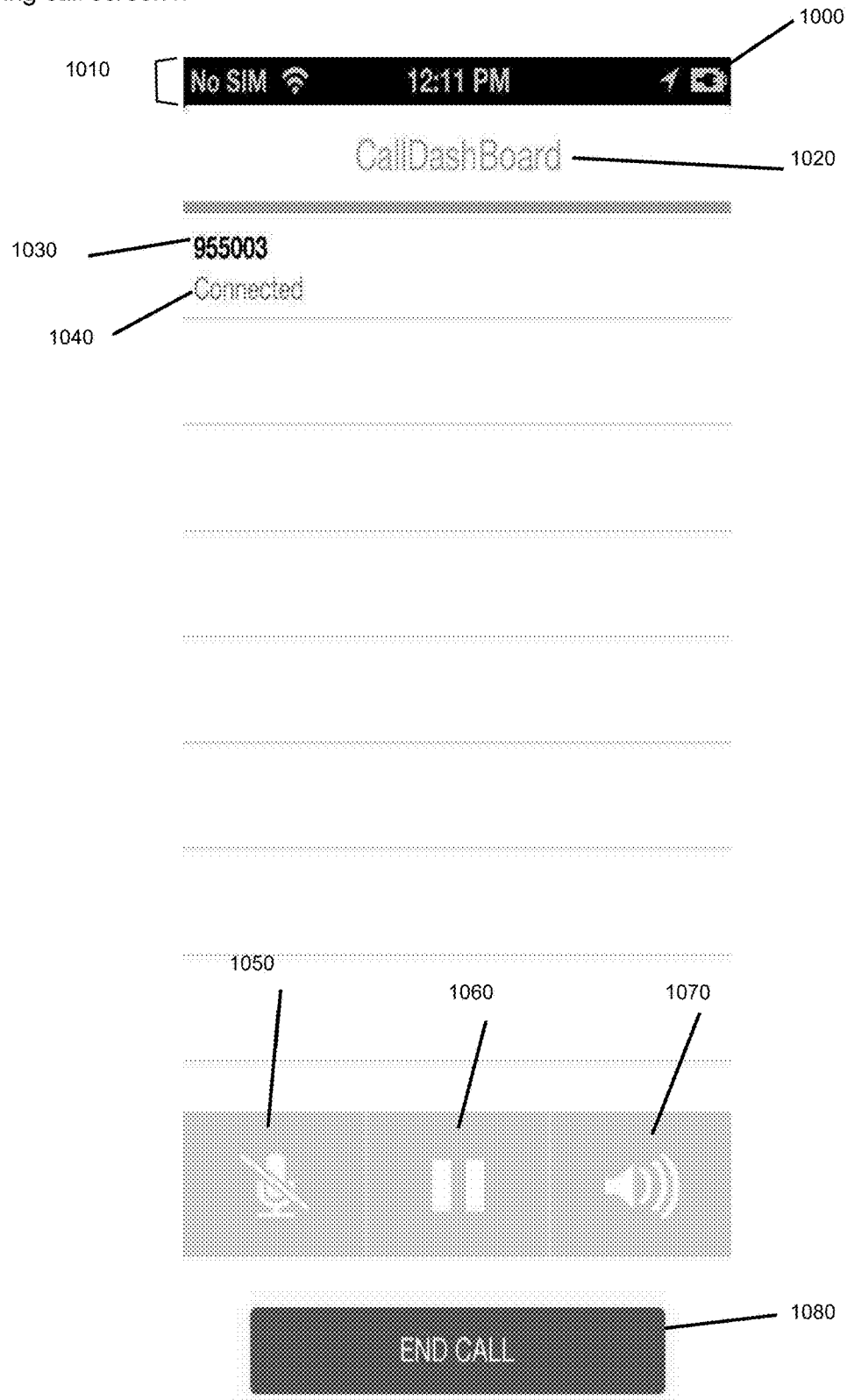
Figure 11:
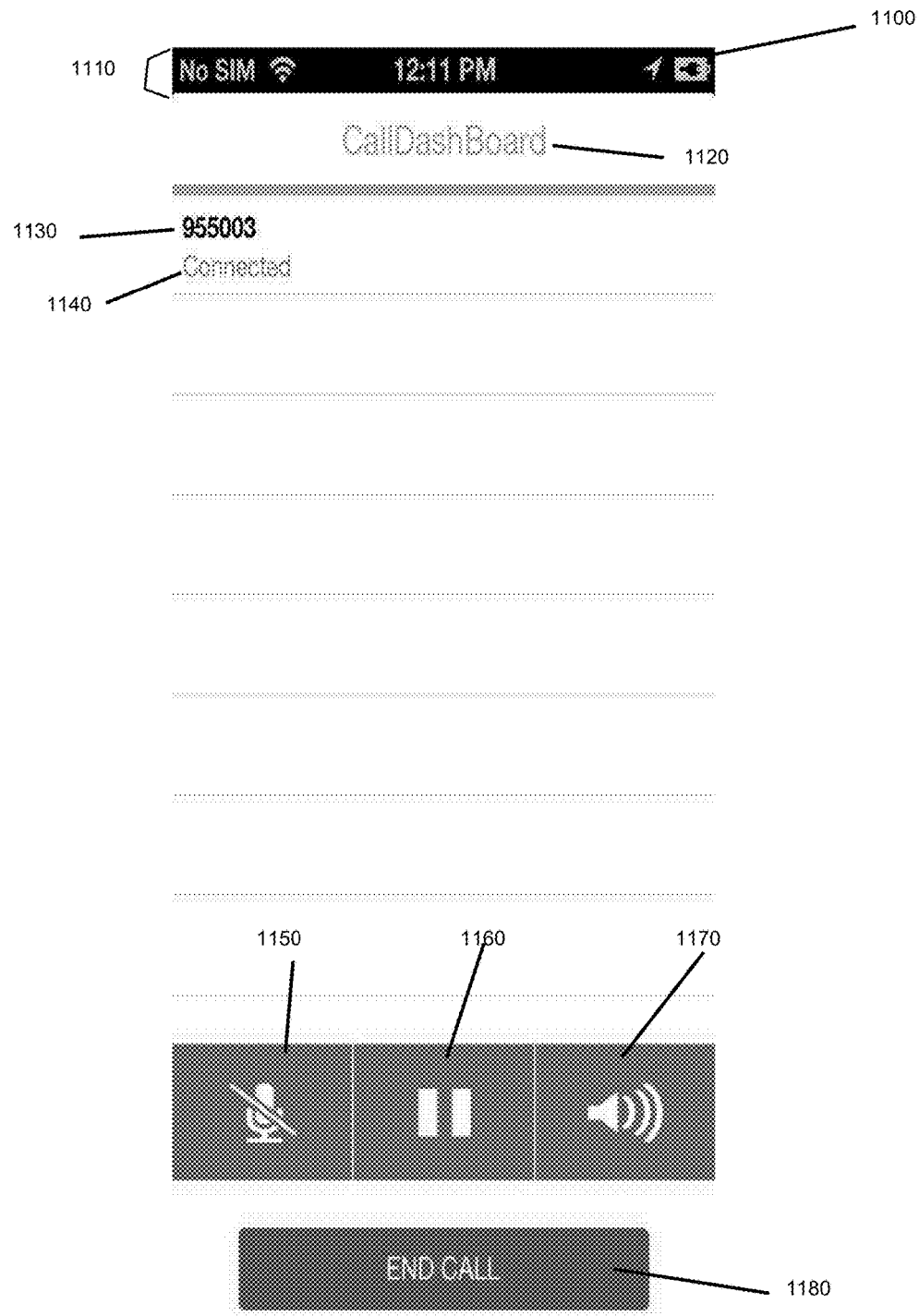
Figure 12:
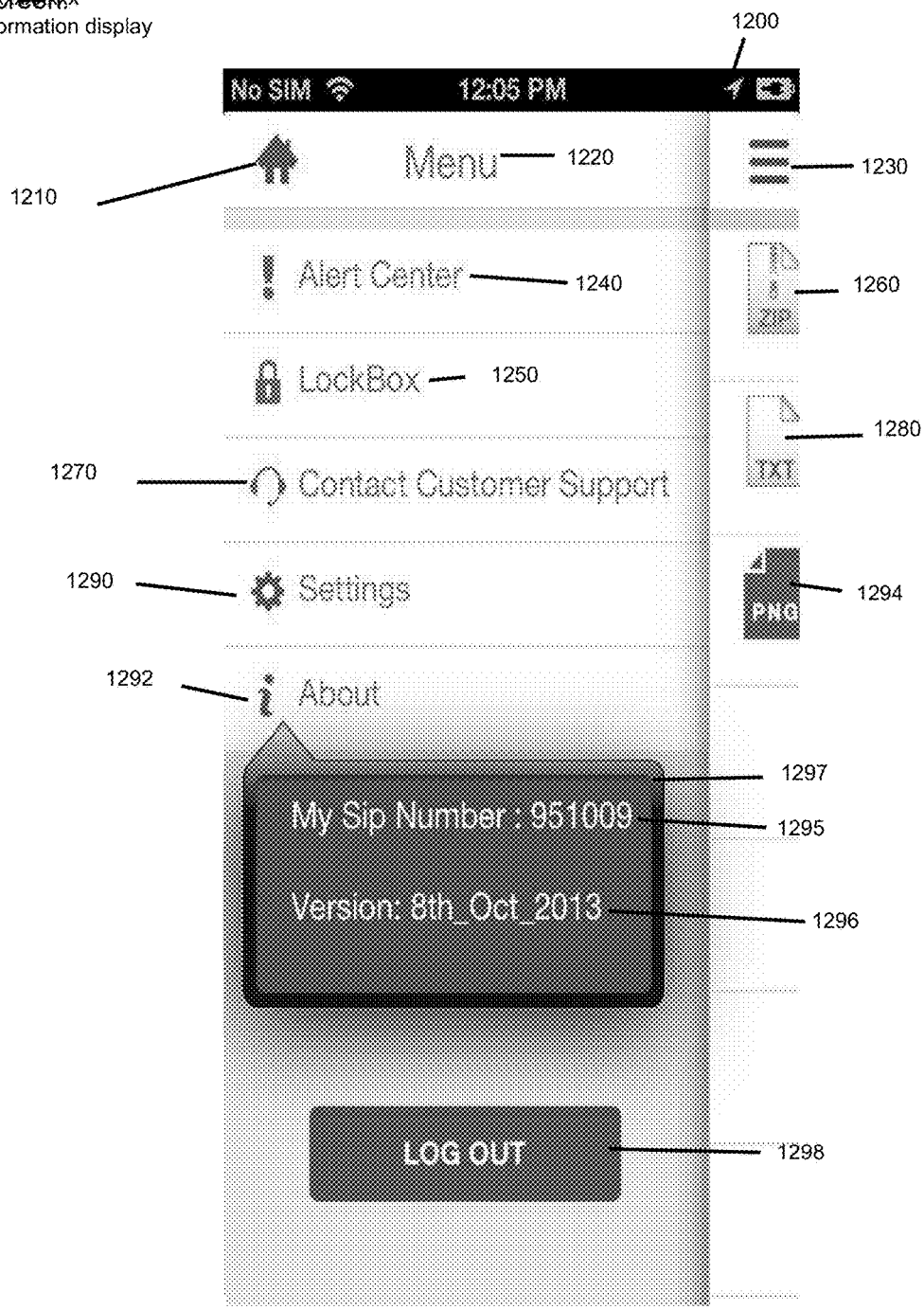
Figure 13:
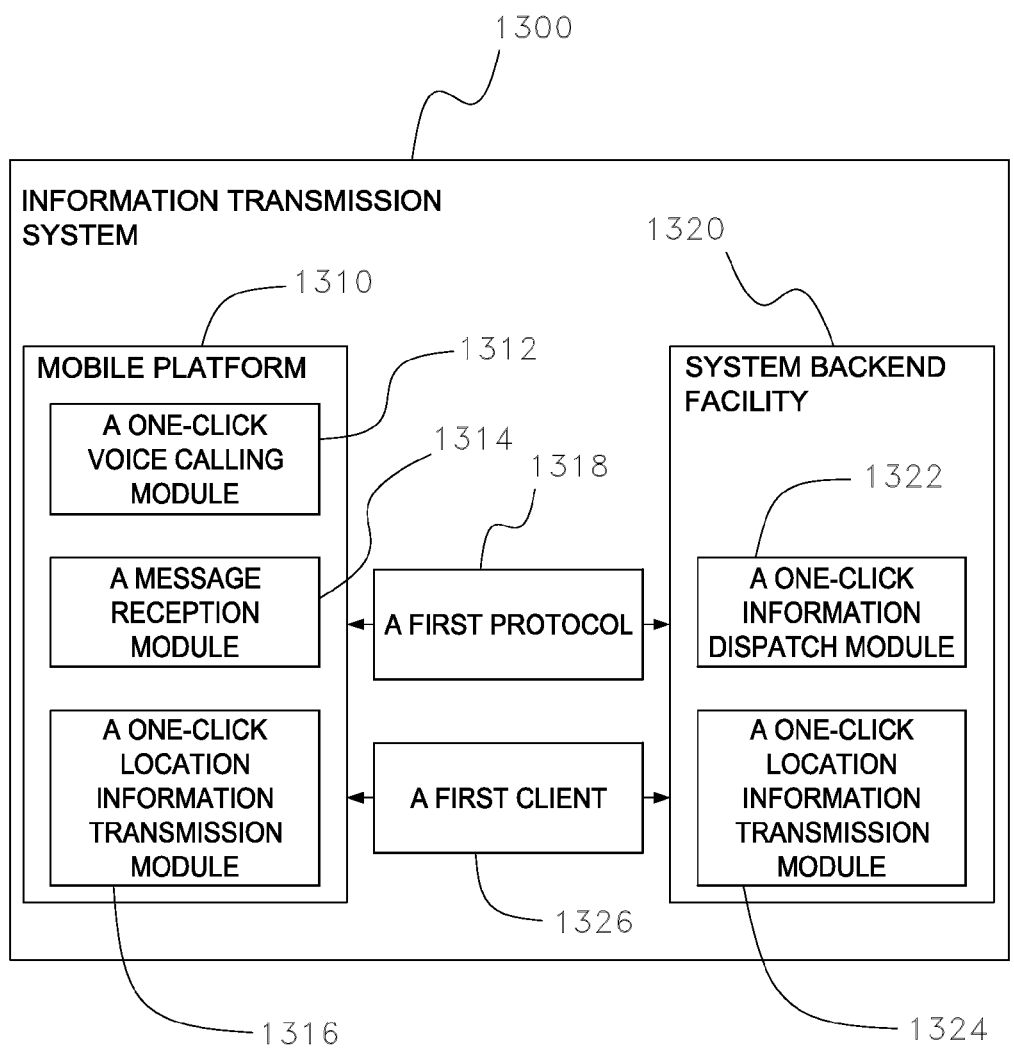

FIG. 3 displays a menu screen interface of the disclosed system;

FIG. 4 indicates an alert center interface of the disclosed system;

FIG. 5 shows a details interface of the disclosed system;

FIG. 6 illustrates a lockbox details interface of the disclosed system;

FIG. 7 depicts an incoming call acceptance/rejection interface of the disclosed system;

FIG. 8 shows an incoming call status indicator interface of the disclosed system;

FIG. 9 indicates a graphic representation of a dial pad interface of the disclosed system;

FIG. 10 displays an outgoing call status indicator interface of the disclosed system;

FIG. 11 shows an outgoing call control indicator interface of the disclosed system;

FIG. 12 indicates a device information display interface of the disclosed system; and FIG. 13 depicts a system diagram of the disclosed invention according to a preferred embodiment of the disclosed invention.

5. DETAILED DESCRIPTION OF THE INVENTION

The disclosed invention herein suggests an alternative method of communication which not only circumvents the aforementioned inherent limitations of the SMS system, but also provides other useful features. The invention that is the subject of this patent application pertains generally to the field of communications systems. The invention relates to an advanced set of use cases using a mobile communication device. In one embodiment of the disclosed invention an end user application is downloaded on a mobile communication device of an end user. The downloaded application residing on the mobile communication device leverages mobile platform technology to allow the end user to engage in two-way message communication by sending and receiving messages via the downloaded application. As would be understood by one of ordinary skill in the art, every aspect of the present invention may be implemented by a computing device and it would likely be more than one computing devices. The term computing device and/or device may include, without limitation, a personal computer, laptop, handheld device, smart phone, iPhone®, Ipad®, Galaxy® or any other device that may be introduced in the future.

The disclosed system may include a modality for two-way text message transmission to one or more mobile platform recipients for emergency and non-emergency communications that utilizes either the Transmission Control Protocol (TCP) or Internet Protocol (IP), or Session Initiation Protocol for Instant Messaging and Presence Leveraging Extensions (SIMPLE), between inter-cooperating processes from the system backend to the mobile application. Furthermore, the disclosed system may include a one-click mobile platform voice calling capability via a Session Initiation Protocol (SIP) or Real-time Transport Protocol (RTP) client to a backend Interactive voice response (IVR) or an inbound call facility or Customer Support staff member. The term single-action would include one-click actions.

The disclosed system may also include a voice message reception capability on the mobile platform as the result of a message sent to one or more mobile platform recipients. Likewise the disclosed system may comprise a capability for the backend to send a file (or files) to one or more recipients via TCP/IP/SIMPLE protocols. Further, the disclosed system may offer a capability from the mobile platform permitting a mobile user to send a one-click message to the backend with location information and a capability that permits the send word now (SWN) backend to locate and send messages to mobile platform applications based solely on their physical location.

It is noted that the depicted interfaces as described herein may be configured to add and subtract softkey functions or to adjust existing functions in different versions of the application. Features and functionality may be embodied in many different forms and should not be construed to limit the scope of the disclosure related to this invention. Many other functions (not shown) may be added to enhance the functionality of the invention. Conversely, not all of the functions need to be present on a particular version in order for the invention to function. Versions of the invention can include different configurations of functionalities. Additional systems, methods, features and embodiments of the invention will be, or will become, apparent to someone who is skilled in the art of examining the Figures and detailed description set forth below. All such additional systems, methods, features and embodiments are included within this description and are within the scope of the claimed subject matter and are protected by the claims that follow.

Figure 1:
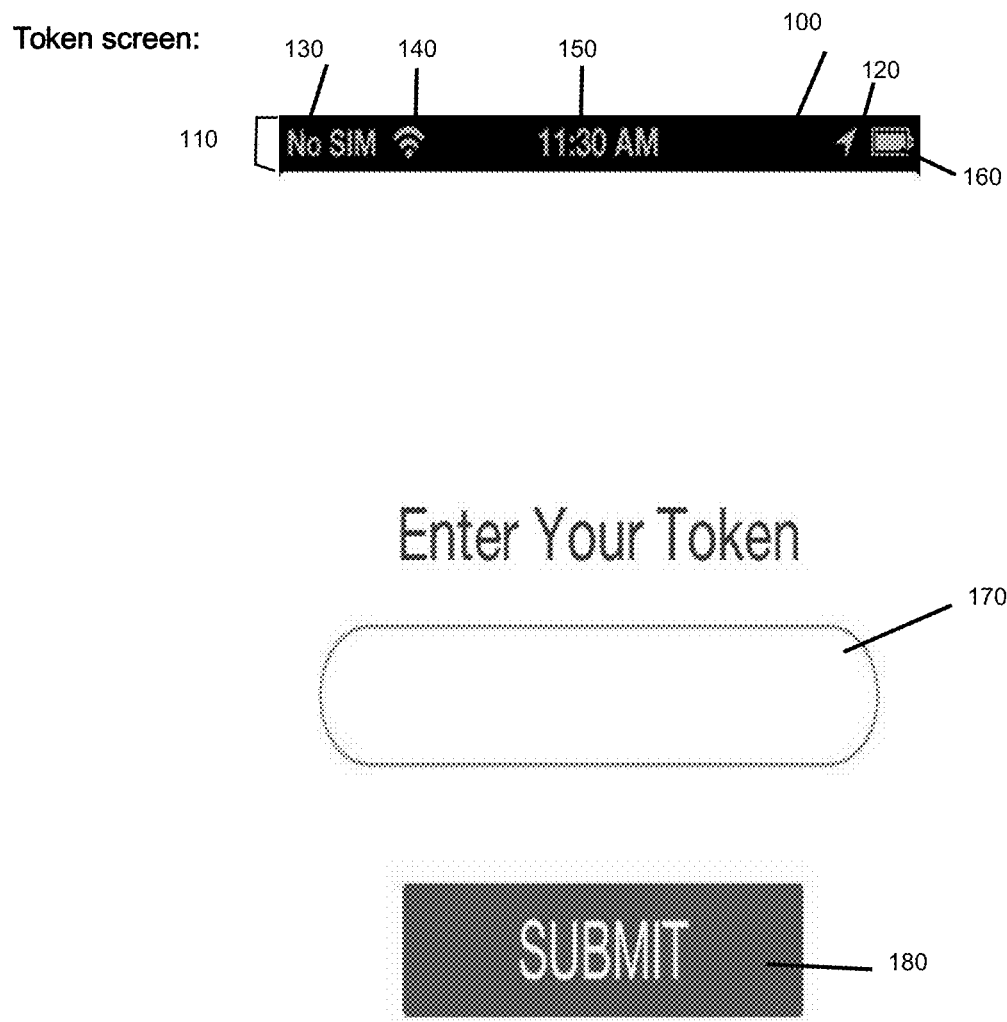
FIG. 1 depicts a token screen interface of the disclosed system.

Now referring to FIG. 1 depicting a token screen interface of the disclosed system. Interface 100 as shown in FIG. 1 is displayed on a communication device (not shown in FIG. 1). Alternatively, interface 100 may also be any other communication device including but not limited to a smart phone, a tablet, a personal computer, a gaming device and the like. A header 110 may include pertinent information regarding the communication device such as a device identification number 130, a device communication range indicator 140, a time indicator 150, an airplane mode indicator 120, and a power indicator 160. A user may be prompted to enter a validation token at an input field 170 and select a response submission link 180 upon entering the validation token.

Figure 2:
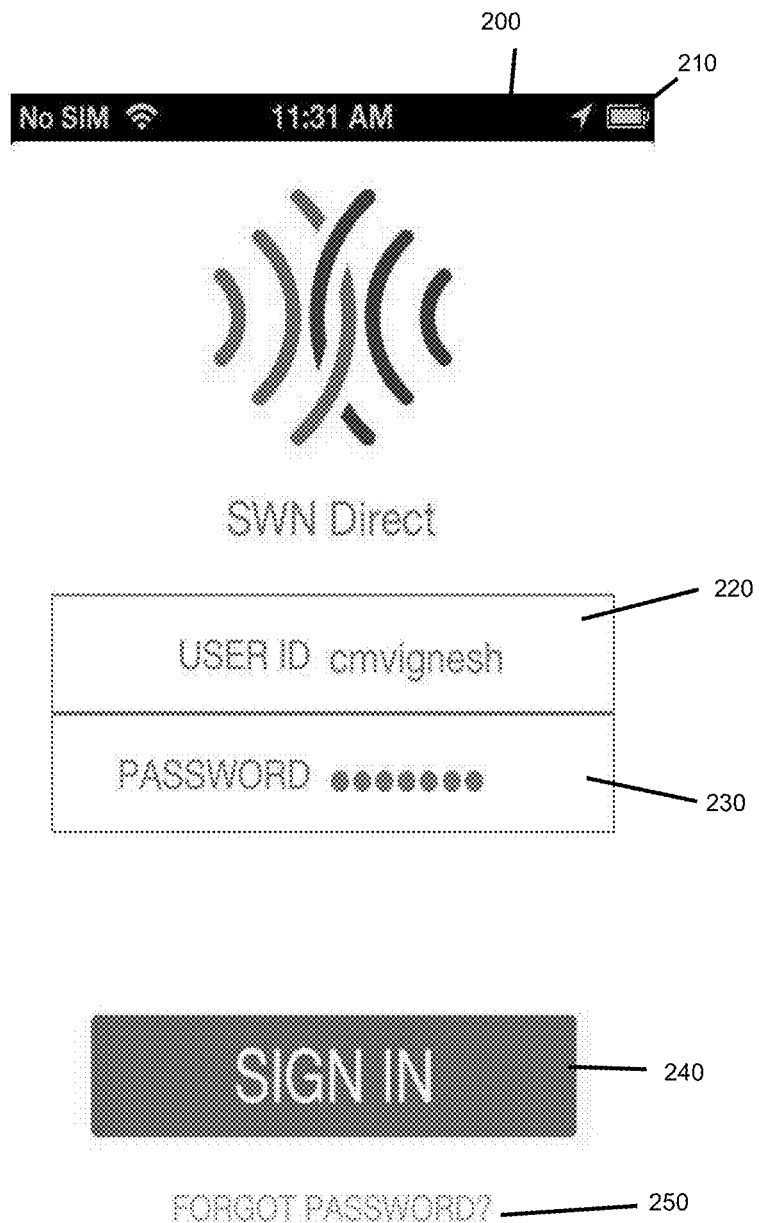
FIG. 2 illustrates an exemplary representation of a login screen of the disclosed system.

After providing a valid token the user is prompted to provide user credentials at a login screen of the disclosed system, as displayed in FIG. 2. As described above, a header 210 on the interface 200 may include pertinent information regarding the communication device. The user is prompted to provide an alphanumeric user identification string 220 and an alphanumeric password string 230 before selecting a sign in link 240. When the user provides a valid user identification string 220 and a valid password string 230, an interface 300 illustrated in FIG. 3 is displayed to the user. Alternatively, if the user is unable to provide either a valid user identification string 220 or a valid password string 230, the user may select forgot password link 250 to get further assistance for resolving login issues.

FIG. 3 depicts a menu screen interface of the disclosed system. Interface 300 as shown in FIG. 3 is displayed on a communication device, not shown in FIG. 3. A menu 320 is displayed on the interface 300 which may contain a home link 310 which points to the alert center, and a return to main menu option 330 to return to the main menu page. Further, the menu 320 may include an alert center option 340, a lock box option 350, a contact customer support option 370, a settings option 390, and an about option 392. The disclosed system has an ability to attach different types of files to an outgoing message for example, a zip file 360, a text file 380 and an image file 394 can be attached to a message as shown in FIG. 3. In one embodiment of the disclosed system, a vanish option may be selected for delivering a confidential message. The vanish option may cause the confidential message to vanish upon the recipient viewing the confidential message effectuating a secured dispatch of the confidential information. This feature may be helpful in protecting confidential information dispatched to the recipient's lost or stolen computing devices.

After performing desired operations on the interface 300, a user may select a log out option 396 to terminate the session. Alternatively, if the user selects the alert center option 340 on the interface 300, then an interface 400 which is displayed in FIG. 4 is displayed to the user. Similarly, if the user selects the lockbox option 350 on the interface 300, then interface 600 which is displayed in FIG. 6 is displayed to the user. Likewise, if the user selects the about option 392 on the interface 300, then an interface 1200 which is displayed in FIG. 12 is displayed to the user.

FIG. 4 depicts an alert center interface 400 of the disclosed system. The alert center interface 400 may be displayed when a user selects the alert center option 340 in FIG. 3 via a single-action (which may include a one-click or screen stroke). An example of the alert center is depicted in FIG. 4. The alert center interface 400 illustrates an alert center listing with an emergency manager, a lockbox Item, an outgoing call, as well as an incoming call instance. The alert center interface 400 as shown in FIG. 4 is displayed on a communication device. At the top, a return to main menu option 410 is provided to return to the main menu page and an alert center option 420 are displayed on the interface 400. The alert center interface 400, when selected, may display notifications such as an incoming call notification 430, and an outgoing call notification 480, each of these notifications may contain additional information regarding the notifications such as caller identification information 432, call date information 434, call time information 436 and call duration information 438.

Additionally, the alert center interface 400 may display notifications pertaining to a set of received files such as HTML files 470 and 490 along with a zip file 440, a text file 450, and an image file 460. Each of the received file notifications may contain additional information regarding the received files such as file receipt date information 454, file receipt time information 456 and file lock information 452.

FIG. 5 depicts a detail interface of a preferred embodiment of the disclosed system. The disclosed system may allow a message sender to send one or more files to one or more recipients via the TCP/IP or SIMPLE protocol. An interface 500 may display a header 510 to display pertinent information regarding the communication device. The name of a received file 530 is displayed on the interface 500.

A link 550 may be the place where the received file 530 is stored by the system. There may also be an icon depicting a file. A user may select to view the received file 530 by selecting the link 550 (or the icon depicting the file). Alternatively, the user may select to delete the received file 530 by selecting a delete option 540. Notably, the delete option 540 may be selected by a user either before or after reviewing the received file 530. In other words, the user has an ability to delete the received file 530 without having to review the received file 530. After performing desired operations on the received file 530, the user may select return to main menu option 520 to return to the alert center interface 400 depicted in FIG. 4.

When the user selects to view the file by selecting the link 550, then an interface 600 shown in FIG. 6 is displayed. FIG. 6 illustrates a lockbox details interface according to one embodiment of the disclosed system. The interface 600 may display a header 610 to display pertinent information regarding the communication device. The name of a received file 630 may be displayed on the interface 600. The file 640 may also be displayed on the interface 600. The user may select return to main menu option 620 to return to the alert center interface 400 depicted in FIG. 4. At this point, if the vanish option is turned on, the confidential message would vanish upon the recipient viewing the confidential message effectuating a secured dispatch of the confidential information. This feature may be helpful in protecting confidential information dispatched to the recipient's lost or stolen computing devices.

As depicted in FIG. 6, a file recipient may view the received files using the reader associated with the attendant Multi-purpose Internet Mail Extensions (MIME) type. In a preferred embodiment of the disclosed system, version control may be maintained between a system backend and a file repository situated on the communication device. Reporting may be provided by the system backend indicating information including but not limited to a name of the file, a name of the recipient receiving the file, name of the sender, time of file dispatch and time of file receipt.

FIG. 7 depicts an incoming call acceptance/rejection interface according to one embodiment of the disclosed system. FIG. 7 illustrates the voice message reception capability of the disclosed system. The interface 700 may display a header 710 to display pertinent information regarding the communication device 101, not shown in FIG. 7. An incoming call pop up window 720 may be displayed on the interface 700. The incoming call pop up window 720 may additionally display call identification information such as a calling number 730 initiating an incoming call for the called party. The called party may select to answer the incoming call by selecting an answer option 750 or reject the incoming call by selecting by selecting a decline option 740.

In a preferred embodiment of the disclosed system, the system may send a voice message to one or more recipient applications on the mobile platform via SIP/RTP. If, as part of that message, the recipient is invited to join a conference call they can use Dual-tone multi-frequency signaling (DTMF) tones to acknowledge the invitation and be connected to a conference bridge. In addition, recipients can use DTMF tones to answer multiple choice questions sent by the message sender. If the called party selects the answer option 750 then an interface 800 illustrated in FIG. 8 is displayed.

FIG. 8 depicts an incoming call status indicator interface of the disclosed system. The interface 800 may display a header 810 to display pertinent information regarding the communication device. Dashboard 820 displayed on the interface 800 depicts the details of an ongoing phone call. For example, phone number of a calling party 840 may be displayed on the interface. Similarly, a status of an ongoing call 850 may also be displayed on the interface 800. As displayed in FIG. 8 telephone number 1111111111 is a coordinator of the present call. Phone number 9610009 is in the connected state. A user of the device may use features on the phone such as keypad 860 to enter information. The mute button 870 may allow the user to mute the speakers of the device while volume 880 can be used to increase or decrease the call volume. Ultimately, the user may end the phone call by selecting end option 890.

FIG. 9 indicates a graphic representation of a dial pad interface of the disclosed system. Interface 900 illustrates an outbound voice calling capability according to a preferred embodiment of the disclosed invention. The interface 900 may display a header 910 to display pertinent information regarding the communication device. The input display area 920 on the interface 900 depicts an input provided by the user of the phone (also referred to as communication device). The claims refer to a mobile platform, which would typically be an application installed on the communication device. Interface 900 depicts the input 930 as number 56, which may be provided by the user of the device. Numeric keys 940 may be selected by the user to provide input 930. Likewise, alphabetic keys may also be used by the user of the device to provide input 930. The process of providing input may be aborted by the user of the device by selecting cancel option 960.

FIG. 10 displays an outgoing call status indicator interface of the disclosed system. The interface 1000 may display a header 1010 to display pertinent information regarding the communication device. A call dashboard 1020 may be displayed on the interface 1000 indicating the details of an ongoing phone call. For example, phone number of a call party 1030 may be displayed on the interface 1000. Similarly, a status of an ongoing call 1040 may also be displayed on the interface 1000. As displayed in FIG. 10, telephone number 955003 is in the connected state. A user of the device may not use the features on the phone such as mute option 1050, pause option 1060, and volume option 1070 since the features are currently disabled. Ultimately, the user may end the phone call by selecting end call option 1080.

FIG. 11 shows an outgoing call control indicator interface of the disclosed system. The interface 1100 may display a header 1110 to display pertinent information regarding the communication device. A call dashboard 1120 may be displayed on the interface 1100 indicating the details of an ongoing phone call. For example, phone number 1130 of a call party may be displayed on the interface 1100. Similarly, a status of an ongoing call 1140 may also be displayed on the interface 1100. As displayed in FIG. 11, the telephone number 955003 is in the connected state. A user of the device may use features on the phone such as mute option 1150 to mute speakers of the device. The conversation between the user of the device and the phone number 955003 may be paused by selecting the pause option 1160. The volume option 1170 can be used to increase or decrease the call volume. Ultimately, the user may end the phone call by selecting end call option 1180.

FIG. 12 depicts a device information display interface of the disclosed system. Interface 1200 as shown in FIG. 12 is displayed on a communication device. A menu 1220 is displayed on the interface 1200 which may contain a home link 1210 which points to the alert center, and a return to main menu option 1230 which can be selected to return to the main menu page. Further, the menu 1220 may include an alert center option 1240, a lock box option 1250, a contact customer support option 1270, a setting option 1290, and an about option 1292. The return to main menu option 1230 displays different types of files that can be attached to an outgoing message for example, a zip file 1260, a text file 1280 and an image file 1294.

After performing desired operations on the interface 1200, a user may select a log out option 1298 to terminate the session. Alternatively, if the user selects the alert center option 1240 on the interface 1200, then an interface 400 which is displayed in FIG. 4 is displayed to the user. Similarly, if the user selects the lockbox option 1250 on the interface 1200, then a lockbox interface is displayed to the user. Likewise, if the user selects the about option 1292 on the interface 1200, then a window 1297 is displayed an interface 1200 which indicates the sip number 1295 of the device and the version number 1296 of the software on the device.

In one embodiment the disclosed system may include the capability to send a one-click instant message to the service backend indicating complete location information. This capability is typically used during a crisis or emergency situation. When location information is transmitted, the location information may subsequently be identified and displayed in a map with a push pin indicating who instantiated the one-click instant message and from which location the one-click instant message was initiated. In addition to the SIP/RTP, an audio channel will be initiated to a hard coded emergency response number for immediate audio transmittal. Need to review the language in this last sentence.

FIG. 13 depicts a system diagram of the disclosed invention. The information transmission system 1300 shown in FIG. 13 is an information transmission system for facilitating communications between a system backend facility 1320 and at least one mobile platform 1310. The system comprises a first protocol 1318 for establishing a communication link between the system backend facility 1320 and the at least one mobile platform 1310. In one embodiment the first protocol 1318 may be a transmission control protocol (TCP), and the system backend facility 1320 may be an interactive voice response (IVR) system. In another embodiment, the first protocol 1318 may be a Session Initiation Protocol for Instant Messaging and Presence Leveraging Extensions (SIMPLE) protocol and the system backend facility 1320 may comprise a customer service representative.

A single-action voice calling module 1312 is also part of the at least one mobile platform 1310. The single-action voice calling module 1312 is configured to communicate with the system backend facility 1320 via a first client 1326. In one embodiment of the disclosed invention the first client 1326 may employ a session initiation protocol (SIP). Further, a message reception module 1314 is also contained in the at least one mobile platform 1310 and is configured to receive a message sent from the system backend facility 1320.

A single-action location information transmission module 1316 of the at least one mobile platform 1310 is configured to send location information of the at least one mobile platform 1310 to the system backend facility 1320. The system backend facility 1320 may comprise a single-action location information extraction module 1324 for locating at least one recipient associated with the at least one mobile platform 1310 based on a predetermined attribute of the at least one mobile platform 1310.

A single-action information dispatch module 1322 of the system backend facility 1320 is configured to send information to the located at least one recipient associated with the at least one mobile platform 1310 via the first protocol 1318. In one embodiment of the disclosed invention, the single-action information dispatch module 1322 may be configured to transmit a set of emergency and non-emergency communications between the system backend facility 1320 and at least one mobile platform 1310. In another embodiment of the disclosed invention, the single-action information dispatch module 1322 may be configured to transmit a two-way text message communication between the system backend facility 1320 and at least one mobile platform 1310.

In yet another embodiment, the first protocol 1318 may be configured to establish a communication link between a set of inter-cooperating processes from the system backend facility 1320 and at least one mobile platform 1310. Additionally, the first protocol 1318 may be configured to establish a communication link between the system backend facility 1320 and a mobile application residing on at least one mobile platform 1310. The single-action information dispatch module 1322 may be configured to transmit a two-way data message communication between the system backend facility 1320 and the at least one mobile platform 1310.

In one embodiment of the disclosed invention, the backend facility 1320 may send messages to mobile platform recipients based on their physical location. A user (which may be located at the backend facility 1320) may draw a shape on a map interface. For example, the user may circle (using their finger on a computing tablet) a geographical area. The mobile platform application would have the ability to respond to backend originated location queries to determine a recipient's eligibility for receiving a message from the backend facility 1320. If a recipient who receives a location query is within the map boundary defined by the user at the backend facility 1320, then the recipient may receive the message.

The disclosed system may allow a message sender to send a message to one or more message recipients via the TCP/IP/SIMPLE protocols to an application on the mobile platform. The transmitted message may contain an unlimited text character count. The disclosed system may provide 100% support of rich text/html messages in addition to guaranteed end message delivery with real-time receipt and integrated diagnostics. Furthermore, the disclosed system may provide an ability to circumvent any censorship constraints that are prevalent in different parts of the world. The disclosed system may reduce cost and expense associated with message transmission. Additionally, the message recipient may view/download file attachments and respond to the alert with a DTMF answer to a multiple choice question.

The invention claimed is:

1. A cost effective method of transmitting emergency and non-emergency, text based and non-text based full duplex communications between a system backend facility and a plurality of mobile platforms (platforms), the method comprising:
   establishing a communication link between the system backend facility and the platforms via a first protocol;
   communicating a message to the system backend facility via a first client by executing a set of single-action voice calling instructions at the platforms;
   receiving communication from the system backend facility by executing a set of message reception instructions at the platforms;
   designating, by the system backend, an emergency area on a map and transmitting a message to a selective set of platforms by executing the single-action information dispatch instructions, wherein the selective set of platforms have confirmed their presence within the designated emergency area in response to receiving location queries from the system backend;
   sending location information of the platform to the system backend facility by executing a set of single-action location information transmission instructions at the platform;
   identifying at least one recipient associated with the platform based on the respective location of the platform by executing a set of single-action location information extraction instructions at the system backend facility; and
   displaying an invitation to join a conference call on each identified recipient's mobile platform by executing the single-action information dispatch instructions.

2. The method of claim 1, further comprising the steps of:
   transmitting, by executing the single-action information dispatch instructions, emergency and non-emergency voice communications between the system backend facility and the platform;
   transmitting, by executing the single-action information dispatch instructions, a two-way text message communication between the system backend facility and the platform; and
   transmitting, by executing the single-action information dispatch instructions, a two-way data message communication between the system backend facility and the platform.

3. The method of claim 1, wherein the first protocol is at least one of: a transmission control protocol (TCP), Session Initiation Protocol for Instant Messaging and Presence Leveraging Extensions (SIMPLE) protocol, and a session initiation protocol (SIP).

4. The method of claim 1, wherein the first protocol is configured to establish a communication link between a set of inter-cooperating processes from the system backend facility and the platform.

5. The method of claim 1, further comprising the step of:
   establishing a communication link between the system backend facility and a mobile application residing on the platform.

6. The method of claim 1, further comprising the step of:
   transmitting, by executing the single-action information dispatch instructions, a set of messages to the at least one recipient associated with the platform solely based on the physical location of the platform.

7. The method of claim 1, further comprising availing guaranteed end message delivery with real-time receipt and integrated diagnostics.

8. A cost effective information transmission system for facilitating text based and non-text based communications between a system backend facility and at least one mobile platform, the system comprising a logic circuit configured to execute instructions to perform the following operations:
   establish a communication link between the system backend facility and the platform via a first protocol;
   communicate a message to the system backend facility via a first client by executing a set of single-action voice calling instructions at the platform;
   receive communication from the system backend facility by executing a set of message reception instructions at the platform;
   send location information of the platform to the system backend facility by executing a set of single-action location information transmission instructions at the platform;
   identify at least one recipient associated with the platform based on the location of the at least one mobile platform by executing a set of single-action location information extraction instructions at the system backend facility; and
   securely dispatch the message to the identified at least one recipient via the first protocol platform by executing a set of single-action information dispatch instructions at the system backend facility.

9. The system of claim 8, wherein the single-action information dispatch instructions are operable to transmit a set of emergency and non-emergency communications between the system backend facility and the platform.

10. The system of claim 8, wherein the single-action information dispatch instructions are operable to transmit a two-way text message communication between the system backend facility and the-platform.

11. The system of claim 8, wherein the single-action information dispatch instructions are operable to transmit a two-way data message communication between the system backend facility and the platform.

12. The system of claim 8, wherein the first protocol is a transmission control protocol (TCP), and the system backend facility is an interactive voice response (IVR) system.

13. The system of claim 8, wherein the first protocol is a Session Initiation Protocol for Instant Messaging and Presence Leveraging Extensions (SIMPLE) protocol and the system backend facility comprises a customer service representative.

14. The system of claim 8, wherein the first client employs a session initiation protocol (SIP).

15. The system of claim 8, wherein the first protocol is configured to establish a communication link between a set of inter-cooperating processes from the system backend facility and the platform.

16. The system of claim 15, wherein the predetermined attribute is the physical location of the at least one recipient and wherein the system is configured to transmit a set of messages to the at least one recipient associated with the platform solely based on the physical location of the platform.

17. The system of claim 8, wherein the first protocol is configured to establish a communication link between the system backend facility and a mobile application residing on the platform.

\* \* \* \* \*